3,053,714
INTUMESCENT COATING
Kenneth N. Edwards, Worthington, Ohio, assignor, by mesne assignments, to Wood Conversion Company, St. Paul, Minn., a corporation of Delaware
No Drawing. Filed May 16, 1957, Ser. No. 659,480
11 Claims. (Cl. 154—44)

This invention relates to intumescent, organic coatings. More particularly, this invention relates to intumescent, asphalt coatings containing phenol-aldehyde resins in combination therewith.

Considerable effort has been directed to improve resistance of organic coatings to fire. Due to the fact that the organic coating material is combustible, a truly fireproof organic coating appears to be improbable. So-called fireproof organic coatings, therefore, are generally meant to mean coatings which will provide some protection of the coated substrate to flame or intense heat and helps to retard or impede the progress of the fire. When the organic coating itself does not inherently have these properties, other materials are sometimes added to impart fire-retardant properties to the coating. This is accomplished, in general, by the addition of materials which evolve an inert gas upon exposure to or contact with fire, or else by the addition of intumescing agents. Gas-evolving materials are believed to function as a diluent of the atmosphere in the area of the combustible materials and thereby retard or inhibit the oxidation of the combustible components of the organic coating. Such certain materials are halogeneated natural or synthetic resins and inorganic carbonate, sulfate or phosphate salts, such as chlorinated natural rubber, chlorinated naphthalene, chlorinated diphenyls, chlorinated hydrocarbons, amid-aldehyde resins, zinc carbonate, and ammonium phosphate.

Perhaps the most important single property for a fire-retardant organic coating is intumescence. This is the property of swelling or puffing when exposed to the heat of a flame. Such swelling of the coating results in a cellular insulating layer between the fire and the substrate. Examples of intumescent agents which have been used in coating formulations, either alone or in combination with each other, are ammonium phosphate, vermiculite, casein, starch, African Isano oil, carbamic phosphoric acid, urea, and methylene disalicyclic acid. With the exception of African Isano oil, the better intumescent agents are water-soluble and, therefore, produce organic coatings having poor water resistance. It has been reported that water-soluble intumescent agents in some instances will leach out and weather away from the coating, thereby reducing or eliminating the fire-resistant property of the coating. In addition, extensive grinding of the coating material with solid intumescent agents is necessary in order to assure thorough dispersion of the agent throughout the composition. This is objectionable in the case of asphalt.

Asphalt is frequently used as a protective coating for wood, paper, and metal, because of its excellent properties with regard to weather resistance, resistance to rotting, its ability to act as a vapor barrier, and also because of its adhesive qualities. In addition, it is an inexpensive product relative to other coating materials. Asphalt coatings, however, are not without their drawbacks, the primary one being that it is combustible and will flow upon application of heat, thereby exposing the substrate to the flame. In addition, because of its combustible nature and its run-off characteristics, the asphalt oftentimes will carry the fire elsewhere and contribute to the spreading of the fire.

It is an object of this invention to provide an asphaltic coating which will intumesce when exposed to the heat of flame.

It is an object of this invention to provide an intumescent asphalt coating wherein the intumescent agent is water-insoluble but compatible with the asphalt.

A further object of this invention is to provide an intumescent asphaltic coating which retains the properties of weather resistance, resistance to rotting, vapor-barrier characteristics, and adhesive properties of asphalt.

It is a further object of this invention to provide an asphaltic coating which will intumesce when exposed to the heat of a flame and form a cellular, thermoset, skeletal, self-supporting structure which supports and helps retain the asphalt in place.

Another object of this invention is to provide an asphaltic coating which will intumesce when exposed to flame and prevent or retard run-off of the asphalt.

Another object of this invention is to provide an asphalt coating which will intumesce when exposed to flame and provide a cellular layer which will help to insulate the coated substrate from the heat of the fire.

Applicant has discovered that an asphalt coating containing certain heat-hardenable phenol-aldehyde resins will intumesce upon exposure to heat of a flame. Applicant has discovered that the combination of a heat-hardenable phenol-aldehyde resin, as hereinafter defined, in combination with asphalt, will form a coating which, upon exposure to the heat of a flame, will swell, bubble, or puff, to produce a firm, resinous, expanded film which helps to shield the substrate from the fire and also to retain the asphalt in place.

The phenolic resins incorporated with the asphalt to produce the coatings of this invention are the heat-hardenable, initial condensation products formed in the first stage of the reaction in the preparation of thermoplastic and thermosetting phenol-aldehyde resins and which initial condensation products can further condense with the formation of water of condensation upon the application of heat. These initial condensation products are called "resoles" and are sometimes referred to as "A stage resins." As is known, the heat-hardenable resoles consist mainly of complex mixtures of alcohols of phenol and phenol derivatives having a relatively high hydroxyl content and a relatively low molecular weight. The resoles are liquid or sirupy semisolid materials which are neither thermoplastic nor thermoset resins, but which can be further condensed with formation of water of condensation to produce resitols which are higher molecular weight, fusible, thermoplastic, phenolic resins. The resitols are sometimes called "B stage resins." The resitols may be further condensed with formation of additional water of condensation to produce resites (sometimes called C stage resins) which are infusible thermosetting resins.

The resoles are sometimes referred to as liquid, solventless phenolics by those skilled in the field of paint and coating technology. The term "liquid" in conjunction with the term "solventless" is used to include resoles which are sufficiently advanced in condensation toward the resitol stage so as to be of a sirupy, semisolid consistency, but exclude solvent solutions of resitols which are often referred to in the art as "liquid phenolics." It should be understood, of course, that the resitols and resites are different from the resoles in many physical properties.

Phenol and formaldehyde are most commonly used in the manufacture of phenol-aldehyde resins. Substituted phenols may also be used. These phenols should have at least two of the 2, 4, and 6 positions on the benzene ring free of substitution in order to be able to progressively condense with the aldehyde and methylol groups upon the application of heat. Many examples of suitable substituted phenols can be mentioned and they include the aliphatic, aromatic, and hydroxy-substituted phenols, for example. The most commonly used substituted phenols are the amyl-, butyl-, and cyclohexyl-substituted phenols, cresol, bisphenol and resorcinol, for example. The rate at which resoles will resinify, i.e., condense to higher molecular weight products into resitols or resites, will vary with the location and extent of substitution of the phenols. Advantages can be taken of this phenomenon to prepare coatings in accordance with the invention to withstand varying degrees of heat before intumescence. The structure of the aldehyde is of less importance than the structure of the phenol in these heat-hardenable resoles, and the only practical limitation on the aldehydes is that of expense. Formaldehyde, paraformaldehyde, furfural, and polymeric furfural are by far the most common aldehydes used in phenol-aldehyde resin manufacture.

For purposes of a complete disclosure and clear understanding of this invention, the constituents of these resoles, as presently understood by those skilled in the art, are identified. As stated, the resoles consist mainly of complex mixtures of alcohols of phenol and substituted phenols. Mono-, di-, and trialcohols of phenol are known to exist in the resole. For example, in the case of a resole prepared from phenol and formaldehyde, saligenin and di- and tri-methylol-substituted phenols have been identified. Also present are simple condensation products of phenol and the methylol-substituted phenols wherein a methylol group on one phenol molecule has condensed with an ortho or para hydrogen atom in an adjacent phenol or methylol-substituted phenol to yield methylol-substituted phenols linked by means of a methylene bridge. These products, dihydroxy diphenylmethanes, for example, contain methylol groups and are capable of further condensation until resitols or resites are obtained. In the case of other aldehydes and substituted phenols, the resoles will consist of analogous condensation products.

The resole may also consist of etherified products of methylol-substituted phenols, that is, alkenyloxybenzenes wherein the alkenyl group is attached to the phenolic oxygen and contains at least three carbon atoms, for example, allyl, methallyl, crotyl, butenyl, etc., as well as halogenated derivatives thereof. Particularly suitable resoles for the purpose of this invention are the unsaturated ethers marketed under the trade name Methylon 75108 by General Electric Company, comprised of a mixture of mono-, di- and trimethylol-substituted phenol allyl ethers. These resoles are produced by reacting phenol and formaldehyde at relatively low temperatures in the presence of an alkali to form methylol-substituted alkali metal phenates. The mixture of the phenates is then reacted with an allyl halide to produce methylol phenol allyl ethers. These heat-hardenable resoles and methods of making them are described in U.S. Patents 2,579,329, 2,579,330, and 2,579,331. The phenolic ethers condense with formation of water of condensation upon the application of heat and are particularly suitable resoles for combination with asphalt in the formulation of intumescent coatings in accordance with this invention.

The asphalt and the resole are thoroughly mixed with each other to form a uniform mixture. It is desirable to heat the components in order to obtain a thorough and complete mixture of the asphalt and the resole. The temperature of the components during the mixing should, of course, be below that temperature at which advancement or substantial advancement of the resole may occur. Prolonged heating, of course, should be avoided because of the reactive nature of resoles. It is preferred that the degree of resinification of the resole be sufficiently advanced toward the resitol stage so that upon the advent of heat of a flame, the resultant foamed mass will quickly thermoset into a heat barrier. It is obvious that the maximum mixing temperature which can be used will depend upon the particular resole used. Thus, the rate of advancement of resoles consisting predominantly of the methylol substituted phenol ethers, as described, will begin to increase within the range of 170° to 485° F. When using these resoles, the mixing temperature during preparation preferably should not exceed 300° F. At these temperatures, thorough mixing can be obtained and the mixture applied in the form of a hot-melt coating without any foaming action.

In some instances it may be desirable to apply the coating of this invention in the form of an emulsion or dispersion rather than as a hot-melt coating. For this purpose the asphalt and resole may be combined in a uniform aqueous emulsion or dispersion, for example. The coating may be applied to the substrate in any suitable manner, such as by brushing or spraying.

Other ingredients commonly added to asphalt coatings for the improvement of fire-retardant properties or other properties may also be added. For example, gas-evolving materials which may inhibit the combustion of the asphalt when exposed to the fire may be added. Compounds helpful in the control of microorganisms deleterious to the substrate may also be added to the coating formulation. This is particularly desirable when the coating is to be used for the protection of wood or paper substrates. Pentachlorophenol, a conventional asphalt coating additive, exhibits microbiocidal properties and also improves the fire resistance of asphalt. Known flame-retardant plasticizers, such as the mixed cresyl phenyl phosphates may also be added. Other plasticizers, such as simple hydrocarbon plasticizing agents may be used. Polychlorinated polyphenyl compounds reduce the flammability and improve the durability of asphalt coatings. Surface active agents may also be added to the asphalt. Oftentimes these agents help reduce the run-off tendencies of asphalt in its heated condition. These additional ingredients may be added to the asphalt-resole coating composition of this invention in the amounts usually added to other asphalt coatings. The proportions of the resole to the asphalt may vary over a very wide range. Actually, the proportions of the resole used will depend upon the degree of intumescent properties desired.

The following examples illustrate the combination of coating asphalt with resoles and other desirable ingredients, such as microbiocidal agents, plasticizers, wetting agents, and flame-retardant ingredients which evolve inert, incombustible gases upon the application of the heat of a flame. The ingredients are added to each other and heated to a suitable temperature, with stirring to obtain complete and uniform mixture. The resoles are preferably added last, and the entire mixing is preferably kept at as low a temperature as possible. A suitable temperature is usually from about 210 to 230° F. In each example the coating was applied in the form of a hot-melt to one side of 43 pound kraft paper. The coating was permitted to cool and then was tested for intumescence by applying the flame from a gas burner directly in contact with the coating. The flammability of the coated paper was determined in accordance with the test described in ASTM designation: D777-46. The char length of this test is reported for each example.

The following samples are offered as a specific disclosure of the invention and are not to be interpreted in a limiting sense.

*Example I*

| Ingredients: | Percent amount |
|---|---|
| Asphalt | 40 |
| Resole (methylol substituted phenol ethers) | 40 |
| Pentachlorophenol | 20 |

The resole is a mixture of allyl ethers of phenol having from 1 to 3 methylol groups linked singly at the ortho and para positions on the benzene ring. The pentachlorophenol functions to inhibit the growth of deleterious microorganisms and also advantageously functions as a fire-retardant agent in the evolution of inert gases upon the application of heat. The coating swelled into a resultant foamed mass and quickly thermoset into a heat barrier upon contact with the flame. The char length was 2.92 inches.

*Example II*

Ingredients: Percent amount
- Asphalt — 30
- Resole (methylol substituted phenol ethers) — 42
- Chlorinated hydrocarbon resin — 12
- Pentachlorophenol — 12
- Plasticizing hydrocarbon oil (spindle oil) — 3.5
- Wetting agent — 0.5

The resole and the pentachlorophenol were the same as in Example I. The chlorinated hydrocarbon resin exhibits fire retardance in the same manner as the pentachlorophenol but, however, has no apparent microbiocidal properties. The wetting agent is a high molecular weight, nonionic surfactant prepared by condensing ethylene oxide with a hydrophobic base formed by condensation of propylene oxide with propylene glycol. The wetting agent reduces the run-off characteristics of asphalt under heat. This coating produced a foamed thermoset mass upon contact with the flame. The char length was 3.63 inches.

*Example III*

Ingredients: Percent amount
- Asphalt — 28
- Resole (methylol substituted phenol ethers) — 40
- Chlorinated hydrocarbon resin — 12
- Mixed cresyl phenyl phosphates — 19
- Wetting agent — 1

The resole, the chlorinated hydrocarbon resin, and the wetting agent were the same as the previous examples. The mixed cresyl phenyl phopshates function as a flame-retardant plasticizer. The coating produced a foamed thermoset mass upon contact with the flame. The char length was 3.12 inches.

*Example IV*

Ingredients: Percent amount
- Asphalt — 28
- Resole (phenol-furfural) — 35
- Polychlorinated polyphenyl — 35
- Wetting agent — 2

The resole consisted of the initial condensation products of the reaction of polymerized furfural with phenol. The polychlorinated polyphenyl functions to plasticize and improve the durability of the asphalt and also acts as a gas evolving agent. The wetting agent was the same as in the previous example. The coating formed a foamed thermoset mass which remained in place after removal of the flame. The char length was about 1.25 inches.

*Example V*

Ingredients: Percent amount
- Asphalt — 28
- Resole — 35
- Polychlorinated polyphenyl — 25
- Epoxy resin — 10
- Wetting agent — 2

The resole, the polychlorinated polyphenyl, and the wetting agent were the same as in the previous example. The epoxy resin, which is a glycidal polyether of a polyhydric phenol has a molecular weight of about 600 to 900 and an epoxide equivalent of about 180. The epoxy resin was added for the purpose of augmenting the thermosetting properties of the resole. The resultant foamed thermoset mass remained in place after removal of the flame. The char length was 3.75 inches.

These coatings have numerous applications, particularly in the building field as a fire-resistant coating for wood, paper- or fiber-board, and metals. For example, the coating is highly suitable in the manufacture of batt insulation wherein the insulation is a batt of fibers, either vegetable or mineral or both, retained between two liners such as kraft paper. The asphalt coatings of this invention may be used to coat the inner surfaces of the kraft liners, and also the outer surfaces if desired. The asphalt coating on the inner surfaces of the kraft liners serves as a moisture barrier and sometimes as an adhesive to bond the liners to the fiber batt. Upon exposure to heat of a fire, the coating of this invention will intumesce and form a thermoset structure which retards the run-off of the asphalt and also helps to hold the liner in place. Although this may only be temporary, it helps to impede or retard the spread of the fire and offers a means to localize the fire until the fire can be brought under control.

Another application for these coatings is on wooden railroad trestles to protect against brush fires. The trestles are susceptible to damage by fires from the brush which collect at the base of the trestles. The coatings of this invention afford a degree of protection against such fires, and also advantageously afford some degree of protection against future fires in the formation of a heat barrier over the surface of the wood until maintenance crews can make their inspection and repair tours. Since the intumescent thermosetting resoles also are water-insoluble, the asphalt coatings of this invention are especially useful for this purpose because they also exhibit weather resistance, rot resistance, and desirable vapor-barrier properties.

As various embodiments could be made in the invention described herein, and since many different changes can be made in the embodiments set forth, it is to be understood that all material disclosed is to be interpreted as illustrative and not in a limiting sense, except as otherwise set forth in the claims.

What is claimed is:

1. An article having a solid fire-retardant coating comprising in uniform admixture an intumescent thermosettable composition of asphalt and a heat-hardenable fluid resole comprised of a mixture of alkenyloxybenzenes having from 1 to 3 methylol groups in the ortho and para positions on the benzene ring.

2. Thermal insulation comprising an insulation filler, a liner on at least one face of said filler, and an intumescent thermosettable solid coating on the inner surface of said liner adjacent to the filler adhesively uniting the filler to the liner, said coating comprising in uniform admixture asphalt and a heat-hardenable fluid resole.

3. Thermal insulation comprising a combustible fibrous insulation filler, a paper mat liner on at least one face of said filler, and an intumescent thermosettable solid coating on the inner surface of said liner adjacent to the filler adhesively uniting the filler to the liner, said coating comprising in uniform admixture asphalt and a heat-hardenable fluid resole.

4. Thermal insulation comprising an insulation filler, a liner on at least one face of said filler, and an intumescent thermosettable solid coating on both surfaces of said liner, the coating on the surface of the liner adjacent to the filler adhesively uniting the filler to the liner, said coating comprising in uniform admixture asphalt and a heat-hardenable fluid resole.

5. Thermal insulation comprising a combustible fibrous insulation filler, a paper mat liner on at least one face of said filler, and an intumescent thermosettable solid coating on both surfaces of said liner, the coating on the inner surface of said liner adjacent to the filler adhesively uniting the filler to the liner, said coating comprising in uniform admixture asphalt and a heat-hardenable fluid resole.

6. Thermal insulation comprising an insulation filler, liners on opposite faces of said filler, and an intumescent thermosettable solid coating on the inner surface of each of said liners adjacent to the filler adhesively uniting the filler to the liner, said coating comprising in uniform admixture asphalt and a heat-hardenable fluid resole.

7. Thermal insulation comprising a combustible fibrous insulation filler, paper mat liners on opposite faces of said filler, and an intumescent thermosettable solid coating on the inner surface of each of said liners adjacent to the filler adhesively uniting the filler to the liner, said coating comprising in uniform admixture asphalt and a heat-hardenable fluid resole.

8. Thermal insulation comprising an insulation filler, liners on opposite faces of said filler, and an intumescent thermosettable solid coating on both surfaces of each of said liners, the coating on the inner surface of each of said liners adjacent to the filler adhesively uniting the filler to the liner, said coating comprising in uniform admixture asphalt and a heat-hardenable fluid resole.

9. Thermal insulation comprising a combustible fibrous insulation filler, paper mat liners on opposite faces of said filler, and an intumescent thermosettable solid coating on both surfaces of each of said liners, the coating on the inner surface of each of said liners adjacent to the filler adhesively uniting the filler to the liner, said coating comprising in uniform admixture asphalt and a heat-hardenable fluid resole.

10. Thermal insulation comprising an insulation filler, a liner on at least one face of said filler, and an intumescent thermosettable solid coating on at least one surface of the liner, said coating comprising in uniform admixture asphalt and a heat-hardenable fluid resole.

11. An article having a solid fire-resistant coating comprising in a uniform intumescent thermosettable composition a basic content of asphalt admixed with a heat-hardenable fluid resole.

References Cited in the file of this patent

UNITED STATES PATENTS

| | | |
|---|---|---|
| 1,336,403 | Weiss | Apr. 6, 1920 |
| 1,911,131 | Langenberg et al. | May 23, 1933 |
| 1,956,866 | Keller | May 1, 1934 |
| 2,025,929 | Young | Dec. 31, 1935 |
| 2,033,411 | Carson | Mar. 10, 1936 |
| 2,489,228 | Rudd | Nov. 22, 1949 |
| 2,501,995 | Dillehay | Mar. 28, 1950 |
| 2,518,241 | McCarthy | Aug. 8, 1950 |
| 2,521,912 | Greenlee | Sept. 12, 1950 |
| 2,581,640 | Fasold et al. | Jan. 8, 1952 |
| 2,667,425 | Bierly | Jan. 26, 1954 |